United States Patent [19]

Hagedorn-Olsen

[11] 4,307,940
[45] Dec. 29, 1981

[54] LENS TURRET

[75] Inventor: Jens Hagedorn-Olsen, Hornbaek, Denmark

[73] Assignee: Océ-Helioprint AS, Kiistgaard, Denmark

[21] Appl. No.: 153,267

[22] Filed: May 27, 1980

[30] Foreign Application Priority Data

May 28, 1979 [EP] European Pat. Off. .......... 79200261

[51] Int. Cl.³ .............................................. G02B 7/16
[52] U.S. Cl. ..................................... 350/254; 355/55
[58] Field of Search .................. 350/254, 39; 352/142; 353/101; 355/55, 56

[56] References Cited

U.S. PATENT DOCUMENTS 2,871,776  2/1959  Calami .............................. 350/254

FOREIGN PATENT DOCUMENTS 705249   4/1941  Fed. Rep. of Germany .
902578   1/1954  Fed. Rep. of Germany .
1077056  8/1960  Fed. Rep. of Germany .
1121922  1/1962  Fed. Rep. of Germany .
1200119  9/1965  Fed. Rep. of Germany .
531524   1/1922  France .
237011   7/1945  Switzerland .
310667   1/1956  Switzerland .

*Primary Examiner*—F. L. Evans
*Attorney, Agent, or Firm*—Albert C. Johnston

[57] ABSTRACT

An optical apparatus for setting any one of a plurality of lenses in a certain operating position and for setting the opening of at least one of the lenses comprises a lens turret rotatable around an axis and having the lenses mounted thereon at locations spaced apart about the same axis, a gear on at least one of the lenses and turnable relative to the turret for adjusting the lens opening, and a drive system including a shaft coaxial with and rotatable in either direction about the axis and carrying a drive gear engaging each adjusting gear for turning the lens turret and each adjusting gear. At least one of the adjusting gears has a limited range of rotation relative to the lens turret in at least one direction so that the turret is rotatable by the drive gear through an adjusting gear when the latter is at a limit of its range of relative rotation. Preferably each lens is provided with an adjusting gear and only one drive gear is employed, which at any moment drivably engages all the adjusting gears.

17 Claims, 9 Drawing Figures

LENS TURRET

The present invention relates to an optical apparatus of a kind which comprises a lens turret rotatable around an axis, a plurality of lenses mounted about said axis on the turret, a diaphram adjusting gear on at least one lens and drive means for rotating the lens turret and the adjusting gear or gears, said drive means comprising a shaft which is coaxial with and rotatable in both directions about said axis and carries a drive gear engaging the lens diaphragm adjusting gear or gears.

French Pat. No. 531 524 describes an apparatus of that kind in which the turret is mounted on a rotatable hollow shaft. A second shaft is mounted coaxially within the hollow shaft, and at the location of the lens turret the second shaft protrudes from the hollow shaft and is provided with a plurality of drive gears. Each lens is provided with a gear for adjusting the lens diaphragm, and for every adjusting gear a drive gear engaging it is provided.

That known apparatus is disadvantageous in that the construction comprising two coaxially mounted shafts enhances the chances for a jam to occur in its use. It is also a disadvantage that two shafts have to be controlled independently of each other, as this requires an extensive control mechanism as well as a double drive mechanism.

The principal object of the present invention is to provide an optical apparatus of the kind described above which employs a single shaft and requires only a single drive mechanism.

According to this invention at least one of the adjusting gears of an optical apparatus of the kind described above cooperates with a stop which is fixed relative to the lens turret so as to restrict rotation of said adjusting gear. Upon driving the shaft of the apparatus to rotate the drive gear the adjusting gear is rotated up to the point where its rotation is stopped by the stop. Then, on further rotation of the shaft in the same direction, the lens turret will be rotated via the adjusting gear and the stop. The driving can be continued until the selected lens has arrived at a desired location, and then, by reversing the direction of rotation of the shaft, the adjusting gear of the selected lens can be reset to a desired position.

The optical apparatus of the invention is particularly useful in reproduction cameras having a plurality of lenses mounted on a rotatable lens turret in order to provide a plurality of magnification ratios. The lenses preferably are mounted so that the adjusting gears are all in one plane and are engaged by only one drive gear which at any moment engages every adjusting gear.

Further objects and advantages will become clear from the following description of an optical apparatus embodying the invention, reference being made to the accompanying drawings in which.

Figure 1:
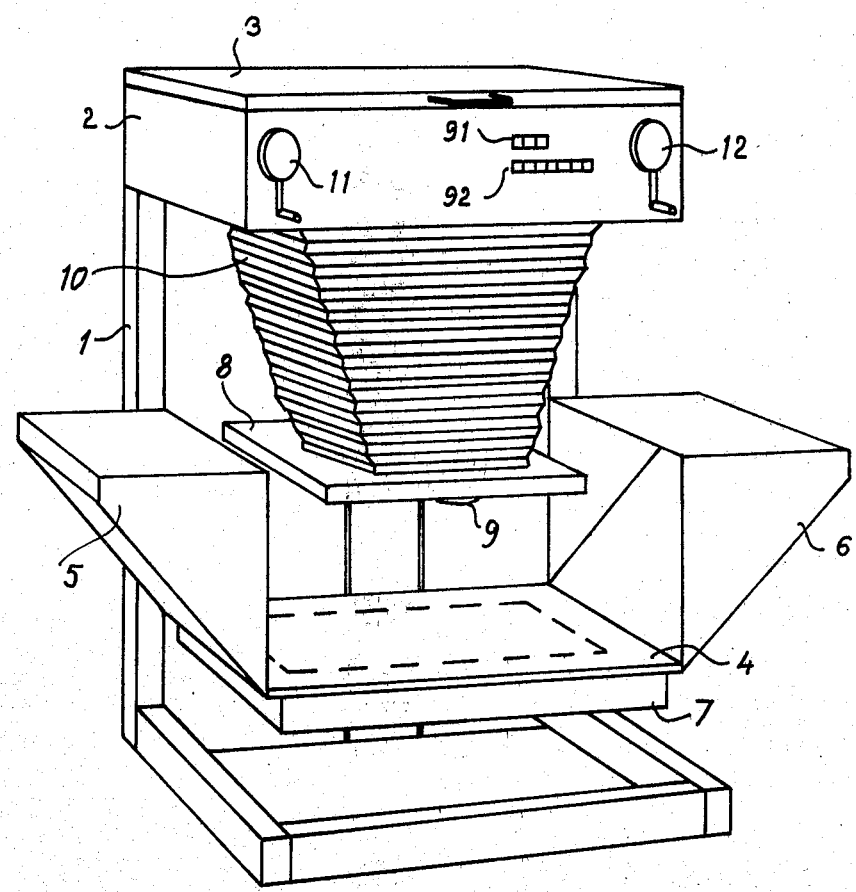
FIG. 1 is a perspective view of a reproduction camera.

The reproduction camera shown in FIG. 1 comprises a frame 1 to which an upper body 2 is firmly fixed. A glass plate functioning as an image plane for receiving light-sensitive material is installed in the upper body, and normally is covered by a hinged cover plate 3.

The camera also comprises a table 4 for receiving the original to be reproduced, lamp housings 5, 6 and 7 for exposing the original, and a holder 8 carrying a rotatable lens turret 9 upon which a plurality of lenses is mounted for rotation around the axis of the turret 9 so that each of the lenses can be placed in position to project an image of the original on the light-sensitive material. A bellows 10 obstructs undesired light during the image projection.

Further, the upper body 2 is provided with two cranks 11 and 12. Crank 11 is connected with the lens holder 8 through means by which, upon rotation of the crank 11, the holder 8 is displaced in vertical direction to select the desired reproduction factor of the camera, which is defined by the distance between the glass plate and the lens. The crank 12 is connected with table 4 via a transmission mechanism so that table 4 can be moved up and down by rotation of the crank 12 to focus the image which is projected on the light-sensitive material.

A first series of pushbuttons 91 is provided on upper body 2 for selecting one of the lenses mounted on lens turret 9. A second series of pushbuttons 92 is provided on the upper body 2 for selecting one of a plurality of diaphragm openings of the selected lens.

The above description is considered to be sufficient for a basic understanding of a reproduction camera in which an optical apparatus according to the present invention can be used.

Figure 2:
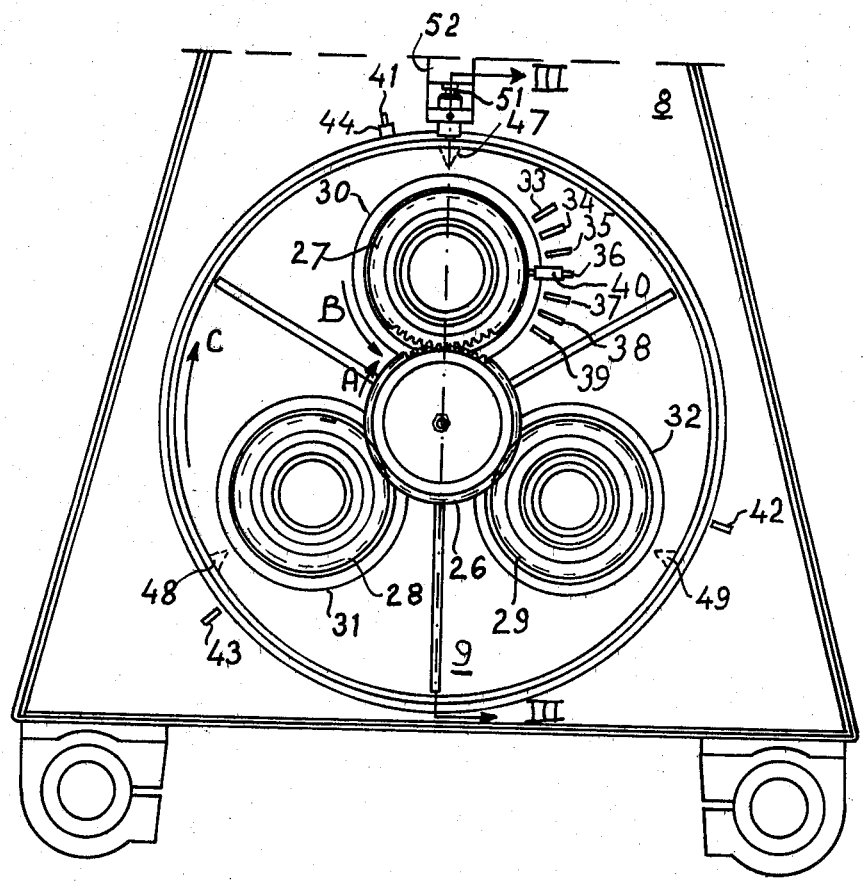
FIG. 2 is a plan view of a lens turret of the apparatus.
Figure 3:
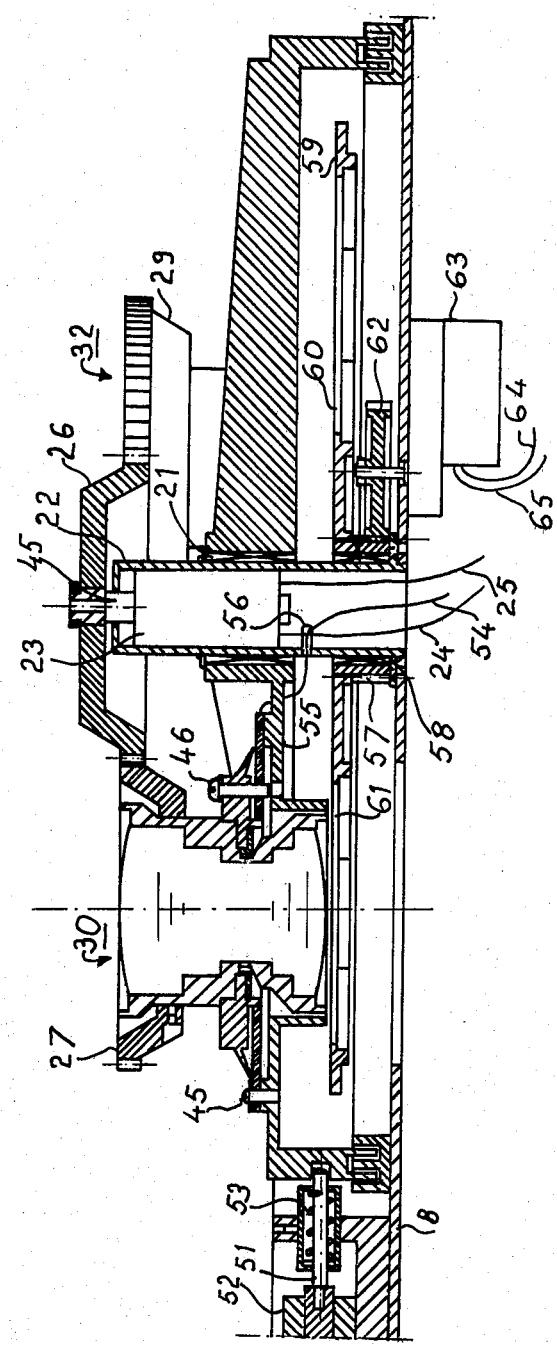
FIG. 3 is a sectional view along the line III—III in FIG. 2.

FIGS. 2 and 3 of the drawings show a holder 8 in which a lens turret 9 is mounted for rotation about a central axis on bearings 21 and a hollow shaft piece 22. A d.c. electromotor 23 having connecting leads 24 and 25 is mounted centrally in shaft piece 22. Mounted upon motor 23 via a torsion device 45 is a drive gear 26 to be rotated when motor 23 is energized by a d.c. source of electrical energy 101 (FIG. 4) through the connecting leads 24 and 25. Drive gear 26 engages diaphragm adjusting gears 27, 28 and 29, respectively, of lenses 30, 31 and 32, which have different focal lengths. The lenses 30, 31 and 32 are fixedly mounted on the turret 9, for example by means of bolts 45 and 46 as shown, so that their optical axes are parallel to each other and are parallel to and equidistant from the axis of rotation of the lens turret 9.

Figure 4:
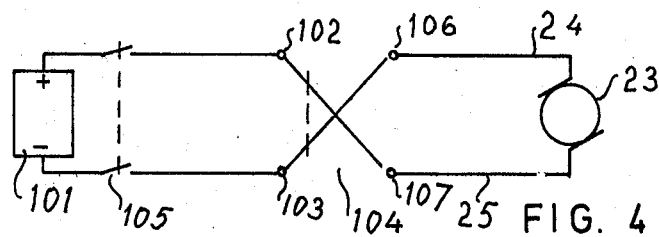
FIG. 4 is a schematic wiring diagram of electrical connections to a motor to be used with the lens turret of FIG. 2.

The direction of rotation of drive gear 26 can be selected in well known manner by suitably connecting the motor leads 24 and 25 to the positive and the negative terminals of a d.c. source through a commutator 104 (FIG. 4).

The adjusting gears 27, 28 and 29 are connected to the diaphragm mechanisms of the lenses 30, 31 and 32, respectively, so that equal diaphragm changes are effected by equal angles of rotation of the adjusting gears. In the illustrated embodiment, for example, the lenses 30, 31 and 32 have focal lengths of 150, 245 and 305 mm, respectively, and each of them has a diaphragm setting range of from f/9 to f/64. Furthermore, the diaphragm settings of all three lenses coincide, i.e., when the diaphragm setting of lens 30 is e.g. at f/16, then the diaphragm settings of the lenses 31 and 32 are also at f/16. A rotation of an adjusting gear through an angle of about 75° covers the complete range of possible diaphragm settings. Further rotation beyond the ultimate diaphragm settings is inhibited by the diaphragm mechanisms inside the lenses, which mechanisms are of well known construction.

Also mounted on the lens turret 9 are seven reed switches 33, 34, 35, 36, 37, 38 and 39. The reed switches 33–39 are positioned on an arc of a circle concentric with the optical axis of lens 30. Mounted on adjusting gear 27 is a permanent magnet 40 which in either ultimate position of the adjusting gear 27 is in operative relationship with reed switches 33 and 39, respectively, whereas in intermediate positions of the adjusting gear 27 the magnet 40 is in operative relationship with one of the other reed switches 34–38. The particular reed switch which is then activated by the magnet 40 is indicative of the diaphragm setting of the lens 30. The active reed switch is also indicative of the diaphragm settings of the lenses 31 and 32, due to the above-mentioned interconnection of their adjusting gears 28 and 29 with adjusting gear 27 via drive gear 26.

Three reed switches 41, 42 and 43 are mounted on the holder 8 at locations spaced apart about the periphery of the lens turret 9. A magnet 44 is mounted on the periphery of the lens turret such that when magnet 44 is facing relationship with reed switch 41 the lens 30 is in operating position. The same holds for magnet 44 and reed switch 42 and lens 32, as well as magnet 44 and reed switch 43 and lens 31, respectively. The lens turret 9 is provided about its periphery with three notches 47, 48 and 49 corresponding in location to the lenses 30, 31 and 32, respectively. An electromagnet 52 mounted on the holder 8 has a spring-loaded shaft 51 which at its end will fit into any of the notches. When the shaft 51 is thus engaged in a notch 47, 48 or 49 the lens turret 9 is locked against rotation relative to the holder 8 and the corresponding lens is held exactly in its correct operating position. The reed switches 33–39 are connected through a multiwire cable 54 to a control circuit 70 to be described in relation to FIGS. 6A and 6B. The cable 54 is led to the rear side 55 of the turret 9 through a slot 56 in the hollow shaft piece 22.

In order to avoid twisting the cable 54 around the shaft piece 22, the commutator 104 is operated by control circuit 70 so that it connects the lead 24 or the lead 25 to the positive (or the negative) pole of the source of electrical energy, respectively, when either reed switch 41 or reed switch 43 is activated by magnet 44. Thus, the drive gear 26 is rotated clockwise or counterclockwise respectively as viewed in FIG. 2.

When reed switch 42 is activated by magnet 44, the lens 31 then being in operating position, the position of commutator 104 is determined by whether lens 31 is to be replaced by lens 30 or by lens 32. The former choice leads to a counterclockwise rotation and the latter to a clockwise rotation of the drive gear 26. In this way the rotation of lens turret 9 is restricted to an angle of 240°.

A gear wheel 57 is mounted rotatably on shaft piece 22 by means of a bearing 58. The gear wheel 57 carries a filter wheel 59 provided with a set of optical filters spaced apart about the axis of gear wheel 57, two of these filters being shown at 60 and 61 (FIG. 3). The filters can be e.g. in the primary colors red, green and blue, in order to obtain color separation images of an original. The gear wheel 57 is in peripheral engagement with a driving gear wheel 62 which can be rotated by an electromotor 63. The motor 63 is connectable to a source of electrical energy (not shown) as by means of leads 64 and 65.

FIG. 4 is a diagram of the electrical connections to motor 23. The d.c. source 101 of electrical energy is connected to a first pair of terminals 102 and 103 of the commutator 104 through a switch 105. The leads 24 and 25 of motor 23 are connected across a pair of terminals 106 and 107 of commutator 104. Switch 105 and commutator 104 are relay-operated by electrical signals generated by control circuit 70.

Figure 5:
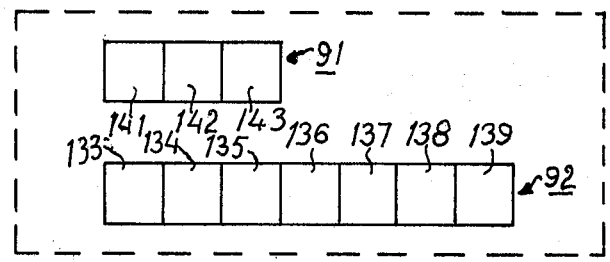
FIG. 5 is a schematic view of part of a control panel of the reproduction camera of FIG. 1.

FIG. 5 is a more detailed diagram of the first and second series of pushbuttons 91 and 92 respectively. The first series 91 comprises three pushbuttons 141, 142 and 143. Pushing one of the buttons 141, 142 or 143 releases both other buttons, so that at any moment only one button is depressed. The second series of pushbuttons 92 comprises seven pushbuttons 133, 134, 135, 136, 137, 138 and 139. Here too pushing of one of the buttons releases all other buttons so that at any moment only one button is depressed.

Figure 7:
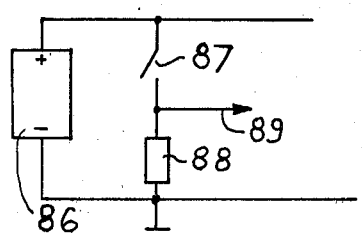
FIG. 7 is a wiring diagram of switches forming part of the control circuit.
Figure 8:
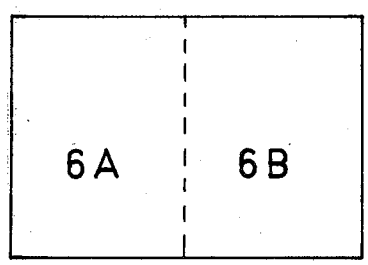
FIG. 8 is a diagram of the fit of FIG. 6A and FIG. 6B.

Every pushbutton and every reed switch mentioned hereinabove comprises a switch 87 (FIG. 7), one terminal of which is connected to a positive terminal of a d.c. voltage source 86 supplying energy to control circuit 70. The other terminal of switch 87 is connected to a junction of one terminal of a resistor 88 and an output line 89. The resistor 88 has a resistance, for example, of 1 kilo-ohm. Its other terminal is connected to the negative terminal of voltage source 86. Each output line 89 serves as an input terminal of control circuit 70 either carrying a 1 or a 0 signal when switch 87 is closed or opened, respectively.

An example of the operation of the optical apparatus described hereinabove is given below:

Assume the lens 30 to be in its operating position as shown in FIG. 2, the magnet 40 then being in operative relationship with reed switch 36, corresponding to a diaphragm setting of f/22. Suppose that both the lens to be employed and the diaphragm setting are to be changed, e.g. by a change to lens 31 at a diaphragm setting of f/45—to the former as represented by reed switch 42 being activated and to the latter as represented by reed switch 38 being activated. Upon activation of the control circuit 70 in a way to be described below, motor 23 is activated through commutator 104 and switch 105 to rotate drive gear 26 in the direction of the arrow A (FIG. 2). Due to the rotation of drive gear 26 all three diaphragm adjusting gears 27, 28 and 29 are rotated in the direction of arrow B until the diaphragm mechanisms inhibit further rotation of the adjusting gears with respect to the lens turret 9. Magnet 40 is now opposite reed switch 33. Motor 23 then keeps on being energized, as provided for by the control circuit 70, and electromagnet 52 is activated to unlock the lens turret 9 by retracting shaft 51 from notch 47 against the spring force of the spring 53. The lens turret 9 then is rotated in the direction of arrow C by the combined action of the drive gear, the adjusting gears and the diaphragm mechanisms of the lenses 30, 31 and 32, with these mechanisms acting as stops until magnet 44 reaches the location of reed switch 42.

The control circuit 70 having been set to react only to the activation of reed switch 42 by magnet 44, upon the activation of reed switch 42 by magnet 44 the electromagnet 52 is deenergized through control circuit 70, thus letting the end of shaft 51 be inserted into the notch 48 by the action of the spring 53 so that the lens turret 9 becomes latched at its position in which the lens 31 is operative. The operation of reed switch 42 also activates the control circuit 70 to reverse the direction of rotation of the motor 23 and thus of the drive gear 26, whereupon the adjusting gear 27 together with the magnet 40 thereon is rotated out of its limiting position, in the direction counter to arrow B. The control circuit 70 having been set to respond to operation of the reed switch 38, when the magnet 40 reaches the location of reed switch 38 the control circuit stops the supply of electrical power to the motor 23 so that all three adjusting gears 27, 28 and 29 are now held in a position corresponding to a diaphragm setting of f/45.

The operation of the control circuit 70 shown in FIGS. 6A and 6B will now be described in detail.

Input signals 1 or 0 to control circuit 70 are derived from the respective output lines 89 of the read switches 33, 34, 35, 36, 37, 38, 39, 41, 42 and 43 and of the pushbuttons 133, 134, 134, 136, 137, 138, 139, 141, 142 and 143. Reed switch 41 is connected to a first input of a two-input AND-gate 145, the other input of which is connected to pushbutton 141. The output of AND-gate 145 is connected to a first input of a three-input OR-gate 146. A second input of OR-gate 146 is connected to the output of a two-input AND-gate 147, the inputs of which are connected to reed switch 42 and pushbutton 142, respectively. The third input of OR-gate 146 is connected to the output of a two-input AND-gate 148, the inputs of which are connected to reed switch 43 and pushbutton 143, respectively. Reed switch 43 is also connected to a first input of two-input AND-gate 149, the second input of which is connected to pushbutton 142. The output of AND-gate 149 is connected to a first input of a two-input OR-gate 150. The second input of OR-gate 150 is connected to the output of a two-input AND-gate 151. A first input of AND-gate 151 is connected to pushbutton 141. The second input of AND-gate 151 is connected to the output of a two-input OR-gate 152 of which the two inputs are connected to reed switches 42 and 43, respectively.

Reed switch 33 is connected to a first input of a two-input OR-gate 153, the second input of which is connected to reed switch 34. The output of OR-gate 153 is connected to a first input of a two-input OR-gate 154, the second input of which is connected to the output of a two-input OR-gate 155, the two inputs of which are connected to reed switches 35 and 36, respectively. The output of OR-gate 154 is connected to a first input of a two-input OR-gate 156, the second input of which is connected to the output of a two-input OR-gate 157, the two inputs of which are connected to reed switches 37 and 38, respectively. The output of OR-gate 156 is connected to a first input of a two input AND-gate 158, the second input of which is connected to the output of a two-input OR-gate 159, the two inputs of which are connected to pushbuttons 138 and 139, respectively. The output of AND-gate 158 is connected to a first input of a three-input OR-gate 160. A second input of OR-gate 160 is connected to the output of a two-input AND-gate 161. A first input of AND-gate 161 is connected to the output of OR-gate 154, the second input of AND-gate 161 is connected to the output of a two-input OR-gate 162, the two inputs of which are connected to pushbuttons 136 and 137, respectively. The third input of OR-gate 160 is connected to the output of a two-input AND-gate 163. A first input of AND-gate 163 is connected to the output of OR-gate 153. The second input of AND-gate 163 is connected to the output of a two-input OR-gate 164, the two inputs of which are connected to reed switches 134 and 135, respectively. Reed switches 33, 34, 35, 36, 37, 38 and 39 are connected to first inputs of two-input AND-gates 165, 166, 167, 168, 169, 170 and 171, respectively. The second inputs of AND-gates 165, 166 167, 168, 169, 170 and 171 are connected to pushbuttons 133, 134, 135, 136, 137, 138 and 139, respectively. The outputs of AND-gates 165, 166 and 167 are connected to respective inputs of a three-input OR-gate 172. The outputs of AND-gates 168, 169 and 170 are connected to respective inputs of a three-input OR-gate 173. The outputs of AND-gate 171 and OR-gates 172 and 173 are connected to respective inputs of a three-input OR-gate 174.

The output of OR-gate 174 is connected to the input of an inverter 175. The output of inverter 175 is connected to a first input of a two-input OR-gate 176. The second input of OR-gate 176 is connected to the output of an inverter 177, the input of which is connected to the output of OR-gate 146. The output of OR-gate 176 is connected to the set-input S of a latch 178, which in this embodiment is incorporated in an integrated circuit element of the type 4043 manufactured by RCA Corporation. Connected to the output of OR-gate 176 is one terminal of a capacitor 179, the other terminal of which is connected to the negative terminal of voltage source 86. The reset-input R of latch 178 is connected to the output of a two-input AND-gate 180. A first input of AND-gate 180 is connected to the output of OR-gate 174. The second input of AND-gate 180 is connected to the output of OR-gate 146. The output Q of latch 178 is connected to the input of a buffer amplifier 181. The output of buffer amplifier 181 is connected to one terminal of a relay 182, the other terminal of which is connected to the negative terminal of voltage source 86. Relay 182 operates switch 105.

The output of OR-gate 160 is connected to a first input of a two-input AND-gate 183, the second input of which is connected to the output of inverter 175. The output of AND-gate 183 is connected to a first input of a two-input AND-gate 184, the second input of which is connected to the output of OR-gate 146. The output of AND-gate 184 is connected to a first input of a two-input OR-gate 185, the second input of which is connected to the output of OR-gate 150. The output of OR-gate 185 is connected to the set-input S of a latch 186 and to a first terminal of a capacitor 187, the other terminal of which is connected to the negative terminal of voltage source 86. The reset-input R of latch 186 is connected to the output of a two-input AND-gate 188, a first input of which is connected to the output of an inverter 189. The input of inverter 189 is connected to the output of AND-gate 183. The second input of AND-gate 188 is connected to the output of a two-input AND-gate 190. A first input of AND-gate 190 is connected via an inverter 191 to the output or OR-gate 150. The second input of AND-gate 190 is connected to the output of a three-input OR-gate 192, the three inputs of which are connected to reed switches 41, 42 and 43, respectively. The output Q of latch 186 is connected to the input of a buffer amplifier 193, the output of which is connected to a first terminal of a relay 194. The other terminal of relay 194 is connected to the negative terminal of voltage source 86. Relay 194 operates commutator 104.

The output of inverter 191 is also connected to a first input of a three-input AND-gate 195. A second input of AND-gate 195 is connected to reed switch 33. The third input of AND-gate 195 is connected to the output of inverter 177. The output of AND-gate 195 is connected to a first input of a two-input OR-gate 196. The second input or OR-gate 196 is connected to the output of a three-input AND-gate 197. A first input of AND-gate 197 is connected to the output of inverter 177. A second input of AND-gate 197 is connected to the output of OR-gate 150, and the third input of AND-gate 197 is connected to reed switch 39. The output of OR-gate 196 is connected to the set-input S of a latch 198 and to a first terminal of a capacitor 199. The other terminal of capacitor 199 is connected to the negative terminal of voltage source 86. The reset input R of latch 198 is connected to the output of OR-gate 146. The output Q of latch 198 is connected to the input of a buffer amplifier 200. The output of amplifier 200 is connected to one terminal of electromagnet 52, the other terminal of which is connected to the negative terminal of voltage source 86.

The control circuit 70 as described hereinabove generates three output signals HM, ML and MB, respectively, which independently of each other are either 1 or 0. The output signal HM is the output signal of latch 198 at the Q output thereof. If HM is 1 electromagnet 52 is energized and shaft 51 is withdrawn to release lens turret 9. The output signal ML is the output signal of latch 186 at the Q output thereof. Commutator 104 is connected in such a way between voltage source 101 and motor 23 that when motor 23 is energized drive gear 26 as viewed in FIG. 2 will be rotated counterclockwise when ML is 1 and clockwise when ML is 0.

The output signal MB is the output signal of latch 178 at the Q output thereof. If MB is 1 switch 105 is closed to energize motor 23 to rotate drive gear 26 in a direction defined by the output signal ML of latch 186. If MB is 0 switch 105 is opened to stop energization of motor 23 and rotation of drive gear 26.

The latches 178, 186 and 198 are integrated circuit elements of the type 4043 manufactured by RCA Corporation. The Q output of such a latch is set to 1 by and remains 1 during and after a 1 pulse at the S-input of the latch. The Q output is reset to 0 by a 1 pulse at the R-input of the latch unless a 1 is present at the S-input of the latch during the duration of the 1 pulse at the R-input. In other words, the S-input is dominant over the R-input, which makes the R-input ineffective as long as a 1 is present at the S-input. To prevent simultaneous 1 to 0 transitions at the S- and the R-inputs, capacitors 179, 187 and 199 are provided to lengthen the durations of 1 signals at the S-inputs of the latches 178, 186 and 198, respectively.

The functioning of the control circuit 70 will now be described by way of two examples, i.e., a first example in which only a diaphragm change takes place and a second example in which a change of lens takes place.

Figure 6A:
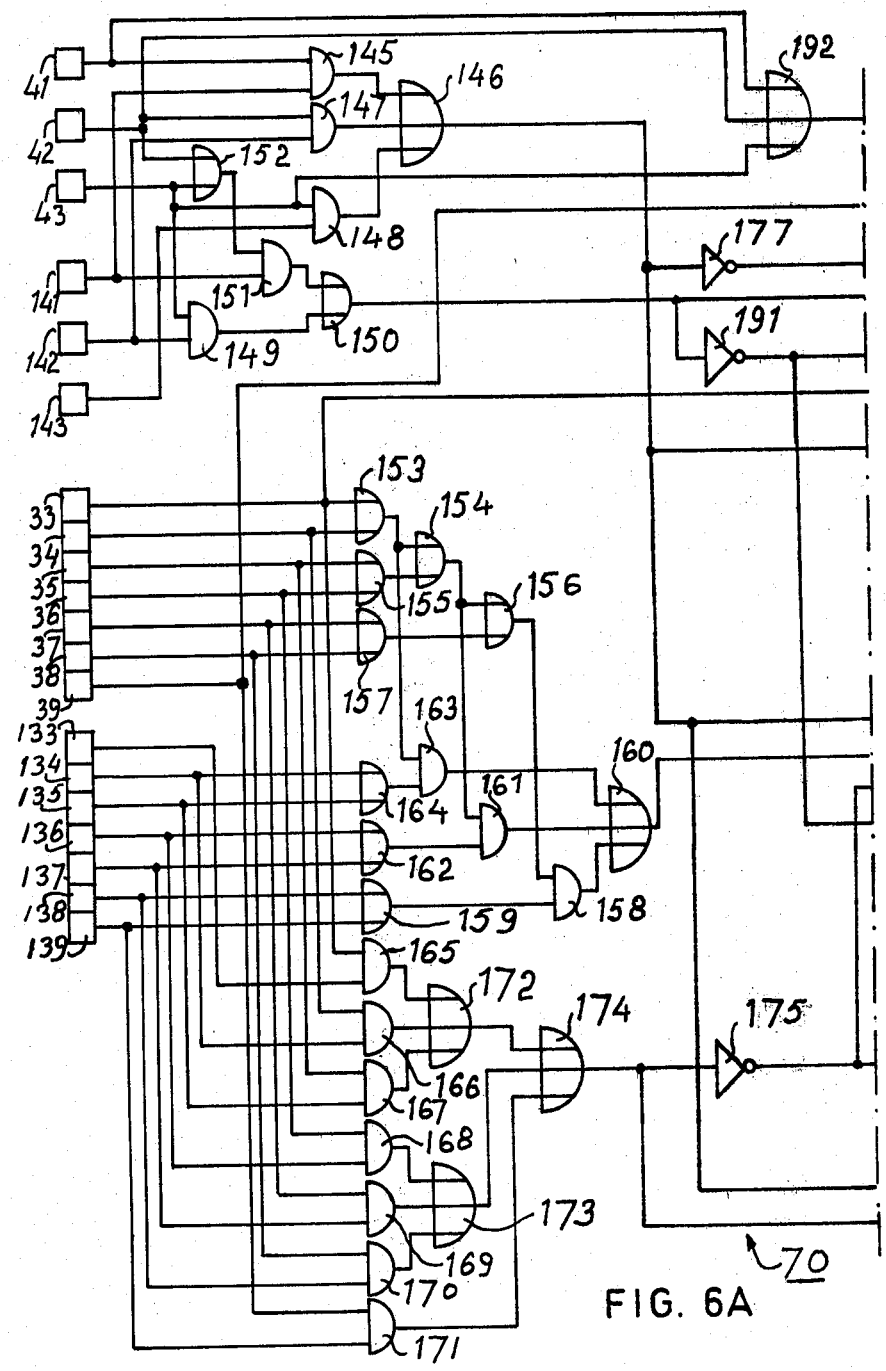
FIG. 6A is a first part of a wiring diagram of a control circuit to be used with the optical apparatus of the invention.
Figure 6B:
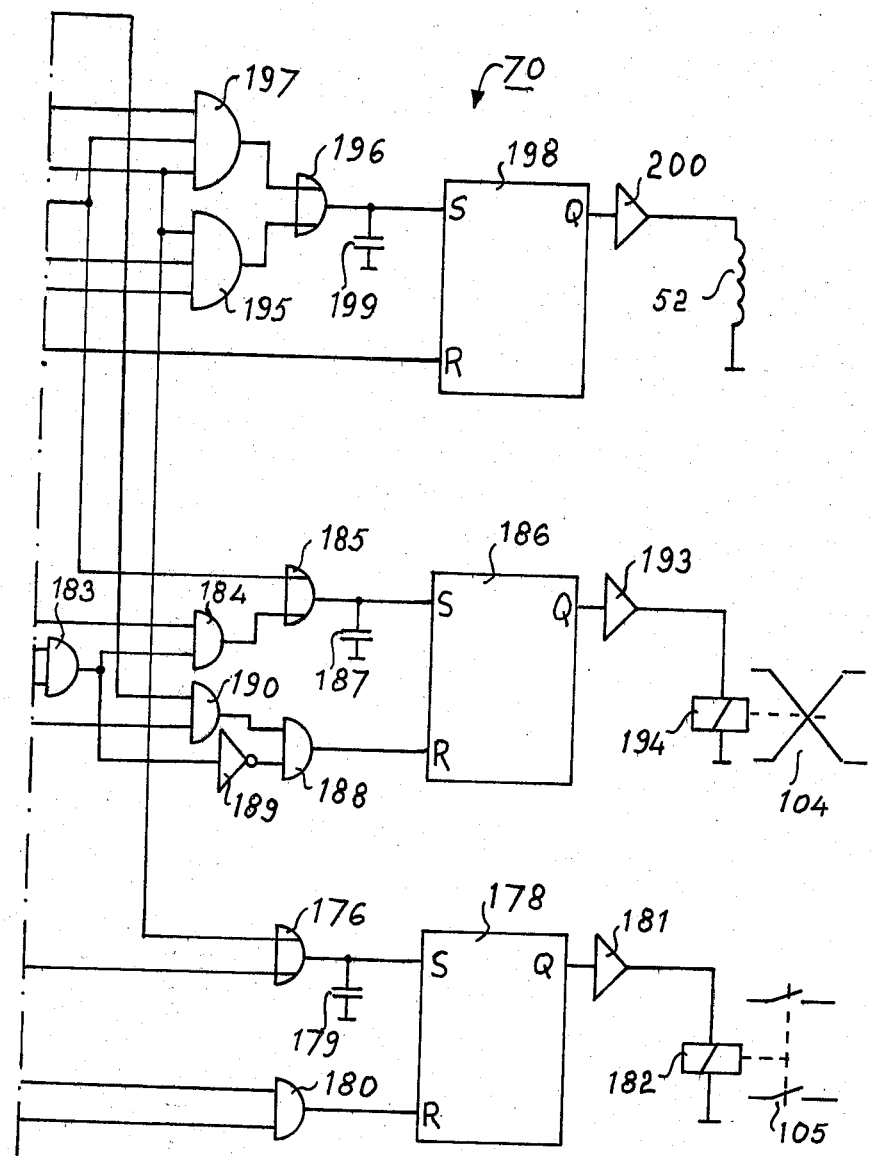
FIG. 6B is a second part of the wiring diagram of the control circuit.

In the first example, assuming that lens 31 is in operating position as indicated by pushbutton 142 having been pressed and reed switch 42 activated, the lines coming from reed switch 42 and pushbutton 142 in FIG. 6A both carry a 1 signal and the lines coming from reed switches 41 and 43 and pushbuttons 141 and 143 all carry a 0 signal. Assuming further that a diaphragm change from f/16 to f/45 should be achieved, the former as indicated by reed swtich 35 being activated and pushbutton 135 pressed, the latter as indicated by reed switch 38 being activated and pushbutton 138 pressed. In the initial state, pushbutton 135 and activated reed switch 35 mean that signals 1 are present in FIG. 6A at the lines coming from pushbotton 135 and reed switch 35, respectively. In the final state, pressed pushbutton 138 and activated reed switch 38 mean that signals 1 are present in FIG. 6A at the lines coming from pushbutton 138 and reed switch 38, respectively. In intermediate states pushbutton 138 is pressed and reed switches 35, 36 and 37 are activated successively, meaning that in those intermediate states signals 1 are present in FIG. 6A at the lines coming from reed switches 35, 36 and 37 successively. It will be shown that in the initial state, upon pressing pushbutton 138 the drive gear 26 will start rotating counterclockwise as viewed in FIG. 2 and will turn until magnet 40 activates reed switch 38.

At least one of the input signals to each of the AND-gates 145, 148, 149 and 151 being 0, the output signals of those AND-gates are 0. Both input signals to OR-gate 150 being 0, an output signal MLL of OR-gate 150 is 0. Both input signals to AND-gate 147 being 1, the output signal of AND-gate 147 and consequently an output signal $\overline{MBL}$ of OR-gate 146 are 1 and an output signal MBL of inverter 177 is 0. Since the signal MBL is an input signal to both AND-gates 195 and 197, both output signals of those AND-gated are 0 and the signal at the set-input S of latch 198 is 0. Since the signal $\overline{MBL}$ is 1 and is applied to the reset input R of latch 198, the output signal HM is 0 and electromagnet 52 is not energized. Since the signal HM cannot be influenced by any of the signals of the reed switches 33-39 and the pushbuttons 133-139, due to the signal MBL being 0, electromagnet 52 keeps on being not energized during any diaphragm change. It results that the lens turret 9 is latched by shaft 51 against being displaced during any diaphragm change.

In the initial state the signal of reed switch 35 is 1, giving a signal 1 at the outputs of OR-gates 154, 155 and 156 and a signal 0 at the output of OR-gate 153. In the initial state the signal of pushbutton 135 is 1, giving a signal 1 at the output of OR-gate 164 and a signal 0 at the outputs of OR-gates 162 and 159. As is now clear, at least one of the inputs of each of the AND-gates 158, 161 and 163 carries signal 0, making signals 0 exist at the outputs of the AND-gates 158, 161 and 163 as well as at all three inputs and (as a signal MLD) at the output of OR-gate 160. Thus, one input signal MLD of AND-gate 183 is 0, which gives a signal 0 at the output of AND-gate 183 and at a first input of AND-gate 184. The second input of AND-gate 184 is applied with the output signal $\overline{MBL}$ of OR-gate 146, which is 1, giving a signal 0 at a first input of OR-gate 185. Supplied to the second input of OR-gate 185 is the output signal MLL of OR-gate 150, which is 0. Thus the output signal of OR-gate 185, which is the input signal of set-input S of latch 186, is 0. The reset-input R of latch 186 is supplied with a signal 1 from the output of AND-gate 188. A first input of AND-gate 188 is supplied with the inverted output signal of AND-gate 183. The second input of AND-gate 188 is supplied with the output signal 1 of AND-gate 190. A first input of AND-gate 190 is supplied with the signal $\overline{MLL}$ which is a 1 signal, and the second input of AND-gate 190 is supplied with the output signal of OR-gate 192, which is a 1 signal because one of the input signals of OR-gate 192 is a 1 signal. Thus the output signal of latch 186 is 0. This means that, unless the signal at the set-input S of latch 186 is changed to a 1 signal, drive gear 26 in FIG. 2 will start rotating clockwise upon energization of motor 23. It will be shown further below that upon pressing pushbutton 138 the signal at the set-input S of latch 186 indeed changes from 0 to 1. The signals 1 of the reed switch 35 and pushbutton 135 are combined in the AND-gate 167 to give a signal 1 at the output thereof. Via the OR-gates 172 and 174 the output signal $\overline{MBD}$ of OR-gate 174 is 1. The outputs of AND-gates 165, 166, 168, 169 and 170 and 171 are all 0, since all of the input signals of those AND-gates are 0. The signal $\overline{MBD}$ is inverted by inverter 175 to give a 0 signal MBD at a first input of OR-gate 176. The second input of OR-gate 176 is supplied with the signal MBL, which is the inverted signal $\overline{MBL}$ at the output of OR-gate 146. Signal $\overline{MBL}$ is 1, and thus signal MBL is 0. Both input signals of OR-gate 176 being 0, a signal 0 is present at the set-input S of latch 178. Since both signals MBL and MBD are 0, the signals $\overline{MBL}$ and $\overline{MBD}$ which are supplied each to one input of AND-gate 180 are 1, giving a signal 1 at the output thereof and at the reset-input R of latch 178. The Q output of latch 178 as defined by a signal 0 at the set-input S and a signal 1 at the reset-input R thus is a signal 0, which means that switch 105 is opened and motor 23 is not energized.

It will be clear from the description given above that the same output signals HM, ML and MB are derived from the following combinations: activated reed switch 41 or 43 and pressed pushbutton 141 or 143, respectively, as well as activated reed switch 33, 34, 36, 37, 38 or 39 and pressed pushbutton 133, 134, 136, 137, 138 or 139, respectively.

Upon pressing pushbutton 138, the output signals of pushbutton 135 and OR-gate 164 change from 1 to 0. However, since the output signal of OR-gate 153 was already 0 no change occurs in the output signal of AND-gate 163, which signal remains 0. The output signals of pushbutton 138 and OR-gate 159 change from 0 to 1. When pressing pushbutton 138 drive gear 26 has not rotated yet and reed switch 35 keeps on being activated until gear wheel 27 has been rotated by drive gear 26 to move magnet 40 away from reed switch 35.

As has been shown above, the output signals of OR-gates 154 and 156 are 1 as long as the output signal of reed switch 35 is 1. It is evident that the output signal of OR-gate 156 also is 1 when one of the reed switches 36, 37 or 38 is activated, either because of the output signal of OR-gate 154 being 1 or because of the output signal or OR-gate 155 being 1. The output signal of AND-gate 158, which initially was 0, changes to 1 upon pressing of pushbutton 138 because both of the input signals to AND-gate 158 have become 1. The output signal MLD of OR-gate 160, which initially was 0, changes to 1 due to the change to 1 of the output signal of AND-gate 158. Upon pressing pushbutton 138 the output signal of AND-gate 166 changes from 1 to 0. Since the output signals of the AND-gates 165, 166, 168, 169, 170 and 171 already were 0, the output signal $\overline{MBD}$ of OR-gate 174 is changed from 1 to 0 and the output signal MBD of inverter 175 is changed from 0 to 1. Signal $\overline{MBD}$ changing from 1 to 0 causes the input signal at reset-input R of latch 178 to change from 1 to 0. The signal at the set-input S of latch 178 changes from 0 to 1 due to the change from 0 to 1 of the signal MBD at an input of OR-gate 176. The signal MB at the Q output of latch 178 changes from 0 to 1 due to the change from 0 to 1 at the set-input S of latch 178; so relay 182 will be energized by the output signal of buffer amplifier 181 to close switch 105 to energize motor 23.

Upon energization of motor 23 by voltage source 101 through switch 105 and commutator 104, drive gear 26 will start rotating in a direction defined by the output signal ML at the output Q of latch 186. The output signal of AND-gate 183 changes from 0 to 1, while the output signal of inverter 189, the output signal of AND-gate 188 and the input signal at the reset-input R of latch 186 change from 1 to 0. The output signal of AND-gate 184, due to the 0 to 1 change of the output signal of AND-gate 183, changes to 1 and thus gives a change from a 0 signal to a 1 signal at an input and the output of OR-gate 185 and at the set-input S and the output Q of latch 186. Relay 194 is then energized to connect the motor 23 to voltage source 101 so that upon closure of switch 105 the drive gear 26 will start rotating counterclockwise as viewed in FIG. 2. Gear wheel 27 is rotated clockwise by counterclockwise rotating drive gear 26, thus moving magnet 40 out of operative relationship with reed switch 35 and into operative relationship with reed switch 36.

It might happen that reed switch 36 would not yet be activated by magnet 40 when reed switch 35 already is deactivated. This would change the output signal of OR-gate 160 from 1 to 0 and lead to a signal 1 at the reset-input R of latch 186. To prevent resetting of latch 186 in such an event, capacitor 187 is chosen with a value such that the input signal at the set-input S of latch 186 will not yet have changed from 1 to 0 when reed switch 36 becomes activated by magnet 40. As has been shown hereinbefore, no change in the output signals HM, ML and MB occurs when reed switch 36 becomes activated instead of reed switch 35. Motor 23 keeps on being energized to rotate drive gear 26 counterclockwise in FIG. 2. The same holds for the transition from reed switch 36 to reed switch 37. However, when the transition occurs from reed switch 37 to reed switch 38 both of the input signals to AND-gate 170 become 1, thus changing the output signal $\overline{MBD}$ to 1 which leads to a resetting and a 1 to 0 transition at the output Q of latch 178 as described hereinbefore in relation to the simultaneous pressing of pushbutton 135 and activation of reed switch 35. Upon the resetting of latch 178, relay 182 is de-energized to open switch 105 and stop energization of motor 23 and rotation of drive gear 26. The magnet 40 is now opposite reed switch 38, which means that the initial diaphragm opening of f/16 has been changed to f/45.

In the second example, again assuming that lens 31 is in operating position as indicated by pushbutton 142 having been pressed and reed switch 42 activated, the lines coming from pushbutton 142 and reed switch 42 in FIG. 6A both carry a signal 1 and the lines coming from reed switches 41 and 43 and pushbuttons 141 and 143 all carry a signal 0. Assume now that lens 31 is to be changed to lens 32, as indicated by pressed pushbutton 143 being pressed and reed switch 43 activated, and that no diaphragm change is needed, the diaphragm setting of lens 31 being at f/16 as indicated by pressed pushbutton 135 and activated reed switch 35, i.e., in the final state the diaphragm setting of lens 32 is also to be f/16 as indicated by pressed pushbutton 135 and activated reed switch 35.

In the initial state all signals are exactly the same as described in the previous example, leading to signals HM, ML and MB all being 0. Upon pressing pushbutton 143 the following changes occur: The output signal of AND-gate 147 goes from 1 to 0, causing output signal $\overline{\text{MBL}}$ of the OR-gate 146 to be 0 and output signal MBL of inverter 177 to be 1. Signal $\overline{\text{MBL}}$ changing to 0 makes the output signals of AND-gates 180 and 183 change to 0. Signal MBL being 1 makes the output signal of OR-gate 176 be 1. Thus the reset-input R of latch 178 is supplied with a signal 0 because the input signal MBL at a first input of AND-gate 180 is 0 and the set-input S of latch 178 is supplied with a signal 1 which makes the output signal MB be 1. Consequently, switch 105 is closed and motor 23 is energized.

The direction of rotation of motor 23 can be determined in the following way: Since the pushbuttons 141 and 142 are not pressed, the output signals of both AND-gates 149 and 151 are 0. Both of the input signals of OR-gate 150 being 0, the output signal MLL of OR-gate 150 is 0 and the output signal $\overline{\text{MLL}}$ of inverter 191 is 1. Signal $\overline{\text{MLL}}$ is one of the input signals of AND-gate 190. The second input signal of AND-gate 190 is the output signal of OR-gate 192, which is 1 since pressing pushbutton 143 does not instantly deactivate reed switch 42; so one of the input signals of OR-gate 192 remains 1. The output signal of AND-gate 190, being a first one of the input signals of AND-gate 188, thus is 1. The second input signal of AND-gate 188 is the output signal of inverter 189. The output signal of inverter 189 is 1 because the signal MBD which is one of the input signals of AND-gate 183 is 0, making the input signal of inverter 189 be 0. Since both input signals of AND-gate 188 are 1, the output signal of AND-gate 188, which is the input signal of reset-input R of latch 186, is 1. This will make the output signal ML be 0 unless the input signal at the set-input S of latch 186 would be 1. That input signal, however, is 0, since the signals MLL, $\overline{\text{MBL}}$, MLD and MBD, which are input signals to gates 183, 184 and 185, are all 0. The output signal ML thus is 0, and motor 23 is connected to voltage source 101 through commutator 104 and switch 105 to rotate drive gear 26 clockwise in FIG. 2.

As long as magnet 44 does not activate reed switch 43, the output signal $\overline{\text{MBL}}$ of OR-gate 146, which is an input signal of AND-gate 184, and the output signal MLL of OR-gate 150, which is an input signal of OR-gate 185, both will remain 0, keeping the input signal at the set-input S of latch 186 at 0 irrespective of any change occurring in the signals of the reed switches 33–39 and pushbuttons 133–139. Also as long as magnet 44 does not activate reed switch 43, the signal MBL which is an input signal to OR-gate 176 remains 1 and thus the output signal MB of latch 178 remains 1, keeping motor 23 energized irrespective of any change occurring in the signals of the reed switches 33–39 and pushbuttons 133–139.

Due to the clockwise rotation of drive gear 26, gear wheel 27 is rotated counterclockwise and brings magnet 40 in sucessive operative relationship with reed switches 34 and 33. As explained above no change occurs in the output signals MB and ML of latches 178 and 186, respectively. However, on activating reed switch 33 a first input signal of AND-gate 195 changes from 0 to 1. The other two input signals MBL and $\overline{\text{MLL}}$ of AND-gate 195 already were 1. Consequently, the output signal of AND-gate 195, which is an input signal of OR-gate 196, changes to 1. That in turn effects a 0 to 1 change of the input signal at the set-input S and of the output signal HM at the output Q of latch 198, thus energizing electromagnet 52 through buffer amplifier 200 to withdraw shaft 51 and release the lens turret 9.

Since the diaphragm mechanisms of the lenses now are in one of their ultimate, or limiting, positions, corresponding to a diaphragm setting of f/9, those mechanisms prevent further rotation of gear wheel 27 relative to the lens turret 9, and the drive gear 26 now starts rotating the lens turret 9 clockwise through gear wheel 27 and the diaphragm mechanisms. The rotation of lens turret 9 takes magnet 44 out of operative relationship with reed switch 42, as a result of which the output signal of reed switch 42 becomes 0. Since the output signal of reed switch 42 was supplied to first inputs of AND-gates 147 and 151, other input signals of which were already 0, no change occurs in signals $\overline{\text{MBL}}$ and MLL. The output signal of OR-gate 192 changes from 1 to 0, and so do the output signals of AND-gate 190 and 188 and the input signal at the reset-input R of latch 186. The 1 to 0 transition at the reset-input R does not affect output signal ML, since the input signal at the set-input S of latch 186 was 0 and remains 0, because neither of the signals MBL and MLL changes.

Motor 23 keeps on being energized and lens turret 9 keeps on rotating until magnet 44 comes into operative relationship with reed switch 43, of which the output signal then changes from 0 to 1. Since the output signal of pushbutton 143 already was 1, both input signals of AND-gate 148 now are 1 and its output signal becomes 1, thus changing the output signal $\overline{\text{MBL}}$ of OR-gate 146 from 0 to 1. Output signal MBL of inverter 177 changes to 0, making one of the input signals of AND-gate 195 be 0 and thus its output signal becomes 0. Since the output signal of AND-gate 197 was 0 and has not changed, both of the input signals of OR-gate 196, its output signal and the input signal at the set-input S of latch 198 change to 0. The 1 to 0 change of the input signal of the set-input S of latch 198 does not affect the output signal HM. Output signal MH, however, is changed from 1 to 0, thus de-energizing electromagnet 52, due to the signal $\overline{\text{MBL}}$ being 1 at the reset-input R of latch 198 as soon as the input signal at the set-input S of latch 198 changes from 1 to 0. De-energization of electromagnet 52 releases shaft 51 to latch the lens turret 9 in a position in which lens 32 is in its operating position.

Output signal MLL of OR-gate 150 is not affected by the activation of reed switch 43 and remains 0, which means that output signal $\overline{\text{MLL}}$ of inverter 191 remains 1. The 0 to 1 change of reed switch 43 makes one of the input signals of OR-gate 192 be 1, and thus the output signal of OR-gate 192 changes to 1. Both input signals of AND-gate 190 being 1, its output signal, which is a first input signal of AND-gate 188, changes to 1 and makes the output signal of AND-gate 188 responsive to changes in its second input signal. It should be realized that at this moment, the lens turret 9 being latched because it has reached the desired position as indicated by pressed pushbutton 143 and activated reed switch 43, and pushbutton 135 being pressed and reed switch 33 activated, the condition is fully equivalent to the condition described in the first example in which pushbutton 138 was pressed and reed switch 35 was activated. It is apparent that now, as in the first example, output signals ML and MB will be such that drive gear 26 will start rotating counterclockwise until magnet 40 activates reed switch 35, at which moment switch 105 will be opened to de-energize motor 23 to stop rotation of drive gear 26. It will be appreciated that, due to reaching the final state as indicated in this example by activation of reed switch 35, the output signal at the Q output of latch 186 changes to 0 thus de-energizing relay 194.

The complete descriptions hereinabove of two cases or examples of the functioning of control circuit 70 are considered to be sufficient for a complete understanding of the functioning of control circuit 70 in any other case.

Although the invention has been described in connection with a vertical reprographic camera, it will be obvious that a lens turret according to the invention can be used with the same advantages on a horizontal reprographic camera.

I claim:

1. An optical apparatus comprising a lens turret rotatable about an axis and having a plurality of lenses mounted thereon at locations spaced apart about said axis so that the turret can set any selected one of said lenses in a given operating position, at least one of said lenses having thereon a gear turnable relative to said turret for adjusting the lens opening, and drive means for turning said turrent and each said adjusting gear, said drive means comprising a shaft coaxial with and rotatable in either direction about said axis and carrying a drive gear engaging each said adjusting gear, at least one said adjusting gear having a limited range of rotation relative to said turret in at least one direction so that said turret is turnable by said drive gear via an adjusting gear when the latter is at a limit of its said range.

2. Apparatus according to claim 1, each of said lenses having a said adjusting gear thereon, said drive means comprising a single drive gear which at any moment drivably engages all the lens adjusting gears.

3. Apparatus according to claim 1 or 2, further comprising a support member having a hollow shaft piece protruding therefrom, said lens turret being mounted on and for rotation about said hollow shaft piece.

4. Apparatus according to claim 3, said drive means including a d.c. motor mounted inside and having a shaft protruding from said hollow shaft piece, said motor shaft being the shaft carrying said drive gear.

5. Apparatus according to claim 3, and a filter wheel mounted on and for rotation about said hollow shaft piece in a plane between said lens turret and said support member, said wheel carrying a plurality of optical filters spaced apart about said axis at locations such that any selected one of said filters can be set by said wheel to a position in optical alignment with a lens in said operating position.

6. Apparatus according to claim 5, and means including a driven gear on said filter wheel, a driving gear engaging said driven gear and a motor connected with said driving gear for positioning said filter wheel.

7. Apparatus according to claim 1 or 2, further comprising control means selectively operable for actuating said drive means to turn said at least one adjusting gear to a limit of its said range and then further to turn said turret via the adjusting gear so as to set a selected lens in said operating position, and for actuating said drive means to turn each adjusting gear relative to said turret to a setting giving a selected lens opening.

8. Apparatus according to claim 7, said control means including means operable to actuate said drive means so that said at least one adjusting gear is turned in one direction until a selected lens is set in operating position and then is turned in the reverse direction and relative to said turret to a position in said range correspnding to a selected lens opening.

9. Apparatus according to claim 7, one said adjusting gear having thereon a control element carried therewith in a path corresponding to said limited range of rotation, and a plurality of switch element spaced apart along said path for actuation separately by said control element at either end of said path and at intermediate locations therealong corresponding respectively to different selectable lens openings.

10. Apparatus according to claim 9, said control element comprising a permanent magnet, said switch elements each comprising a reed switch operable by said magnet when the magnet is at the location of the switch.

11. Apparatus according to claim 9, and a plurality of pushbottons operative one only at a time for activating selectively any one of said switch elements at said intermediate locations.

12. Apparatus according to claim 7, said lens turret having thereon a control element carried therewith in an arcuate path as the turret is rotated, and a plurality of switch elements spaced apart along said path for actuation separately by said control element, each of said switch elements being at a location corresponding to the position of said turret when a certain one of said lenses is in said operating position.

13. Apparatus according to claim 12, said control element comprising a permanent magnet, said switch elements each comprising a reed switch operable by said magnet when the magnet is at the location of the switch.

14. Apparatus according to claim 12, and a plurality of pushbottons operative one only at a time for activating selectively any one of said switch elements.

15. Apparatus according to claim 12, and coacting means respectively on said turret and a support fixed relative thereto for latching said turret in any one of the respective positions thereof in which a lens is set exactly in said operating position.

16. Apparatus according to claim 15, said latching means comprising notches in said turret, each at a location corresponding that of one of said lenses, and on said support a solenoid having an armature spring-pressed into one of said notches when the solenoid is de-energized.

17. Apparatus according to claim 15, said control means including means responsive to activation of a selected one of said switch elements for actuating said latching means.

* * * * *

UNITED STATES PATENT OFFICE
CERTIFICATE OF CORRECTION

Patent No. 4,307,940   Dated December 29, 1981

Inventor(s) JENS HAGEDORN-OLSEN

It is certified that error appears in the above-identified patent and that said Letters Patent are hereby corrected as shown below:

Title page, at [73] "Kiistgaard" should read -- Kvistgaard --.

Column 3, line 34: "lens 32" should read -- lens 31 --.

Column 3, line 35: "lens 31" should read -- lens 32 --.

Signed and Sealed this

Twenty-seventh Day of April 1982

|SEAL|

Attest:

GERALD J. MOSSINGHOFF

Attesting Officer   Commissioner of Patents and Trademarks